(12) United States Patent
Wu et al.

(10) Patent No.: US 9,549,196 B2
(45) Date of Patent: Jan. 17, 2017

(54) DATA UNIT IDENTIFICATION FOR COMPRESSED VIDEO STREAMS

(71) Applicant: Microsoft Technology Licensing, LLC, Redmond, WA (US)

(72) Inventors: Yongjun Wu, Bellevue, WA (US); Sudhakar Visweswara Prabhu, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 328 days.

(21) Appl. No.: 14/172,595

(22) Filed: Feb. 4, 2014

(65) Prior Publication Data
US 2015/0222917 A1 Aug. 6, 2015

(51) Int. Cl.
*H04N 19/46* (2014.01)
(52) U.S. Cl.
CPC ..................... *H04N 19/46* (2014.11)
(58) Field of Classification Search
CPC ................ H04N 19/80; H04N 19/46
USPC ..................... 375/240.26
See application file for complete search history.

(56) References Cited

U.S. PATENT DOCUMENTS

| 5,359,605 | A | * | 10/1994 | Urbansky | H04J 3/076 370/366 |
| 6,094,443 | A | * | 7/2000 | Dwork | G06F 7/02 370/510 |
| 6,373,898 | B1 | | 4/2002 | Langer et al. | |
| 6,470,034 | B1 | | 10/2002 | Tan | |
| 6,628,891 | B1 | * | 9/2003 | Vantalon | H04N 21/4181 348/E5.004 |
| 6,847,365 | B1 | * | 1/2005 | Miller | H04N 21/42607 345/502 |
| 7,974,307 | B2 | | 7/2011 | Meric | |
| 8,213,779 | B2 | | 7/2012 | Crinon | |
| 8,406,291 | B2 | | 3/2013 | Kim et al. | |
| 2004/0095998 | A1 | * | 5/2004 | Luo | H04N 19/53 375/240.16 |
| 2005/0099869 | A1 | | 5/2005 | Crinon et al. | |
| 2005/0135677 | A1 | * | 6/2005 | Seevers | G06K 9/00456 382/165 |

(Continued)

OTHER PUBLICATIONS

"Proposed SMPTE Standard for Television VC-1 Compressed Video Bitstream Format and Decoding Process". SMPTE Draft Standard for Television: SMPTE 421M. Aug. 2005, pp. 1-480.*

*Primary Examiner* — Christopher S Kelley
*Assistant Examiner* — Zhihan Zhou
(74) *Attorney, Agent, or Firm* — Gregg Wisdom; Judy Yee; Micky Minhas

(57) ABSTRACT

Data unit identification for compressed video streams is described. In one or more implementations, a compressed video stream is received at a computing device and a determination is made as to whether prior knowledge is available that relates to the compressed video stream. Responsive to the determination that prior knowledge is available that relates to the compressed video stream, the prior knowledge is employed by the computing device to perform data unit identification for the compressed video stream. In one or more implementations, SIMD instructions are utilized to perform pattern (0x00 00) search in a batch mode. Then a byte-by-byte search is performed to confirm whether the pattern, 0x00 00, found is part of a start code, 0x00 00 01, or not.

21 Claims, 6 Drawing Sheets

(56) References Cited

U.S. PATENT DOCUMENTS

| | | | |
|---|---|---|---|
| 2006/0158682 A1* | 7/2006 | Atsumi | H04N 1/00307 |
| | | | 358/1.15 |
| 2006/0274940 A1* | 12/2006 | Ozaki | G06K 9/4638 |
| | | | 382/180 |
| 2007/0086481 A1* | 4/2007 | Klemets | H04N 21/2381 |
| | | | 370/466 |
| 2008/0031451 A1* | 2/2008 | Poirier | H04L 9/0866 |
| | | | 380/228 |
| 2008/0259799 A1* | 10/2008 | van Beek | H04L 47/2416 |
| | | | 370/235 |
| 2009/0074060 A1* | 3/2009 | Kim | H04N 21/234327 |
| | | | 375/240.12 |
| 2009/0080509 A1* | 3/2009 | Itoh | G11B 27/034 |
| | | | 375/240.01 |
| 2009/0097549 A1* | 4/2009 | Kim | H04N 19/70 |
| | | | 375/240.03 |
| 2009/0285236 A1* | 11/2009 | Morita | H04N 21/63 |
| | | | 370/474 |
| 2011/0274178 A1 | 11/2011 | Onno et al. | |

* cited by examiner

DATA UNIT IDENTIFICATION FOR COMPRESSED VIDEO STREAMS

BACKGROUND

The functionality that is available to users of computing devices is ever increasing. One example of this increase is the ability to consume and output video by the device. To support transfer and storage of the video, the video is often compressed, which may be performed using a variety of different encoding techniques.

However, decompression of a compressed video stream using conventional techniques may be resource intensive. Consequently, use of the conventional techniques may have a significant impact on the functionality of the device, especially in resource sparse operating systems and devices, e.g., mobile devices. Thus, conventional video stream decompression techniques may limit the functionality of the device that is available to a user both to decompress the video stream as well as functionality that is available for other uses.

SUMMARY

Data unit identification for compressed video streams is described. In one or more implementations, a compressed video stream is received at a computing device and a determination is made as to whether prior knowledge is available that relates to the compressed video stream. Responsive to the determination that prior knowledge is available that relates to the compressed video stream, the prior knowledge is employed by the computing device to perform data unit identification for the compressed video stream.

In one or more implementations, a compressed video stream is received at a computing device and a search is performed using one or more single instruction and multiple data (SIMD) operations by the computing device to find a specific byte pattern in the compressed video stream, e.g., "0x00 00." Responsive to the finding of the specific byte pattern in the compressed video stream, a byte-by-byte search is performed by the computing device to verify whether the specific byte pattern is included as part of a start code pattern (e.g., "0x00 00 01") in the compressed video stream to identify a data unit in the compressed video stream.

In one or more implementations, a system comprises one or more modules implemented at least partially in hardware, the one or more modules are configured to perform operations comprising determining if prior knowledge is available that relates to a compressed video stream and responsive to the determination that there is prior knowledge that relates to the compressed video stream, employing the prior knowledge by the computing device to perform data unit identification for the compressed video stream. Responsive to the determination that there is no prior knowledge that relates to the compressed video stream, a search is performed using single instruction and multiple data (SIMD) operation by the computing device to find a specific byte pattern in the compressed video stream. Responsive to the finding of the specific byte pattern in the compressed video stream, a byte-by-byte search is performed by the computing device to verify whether the specific byte pattern is included as part of a start code pattern in the compressed video stream to identify a data unit in the compressed video stream.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
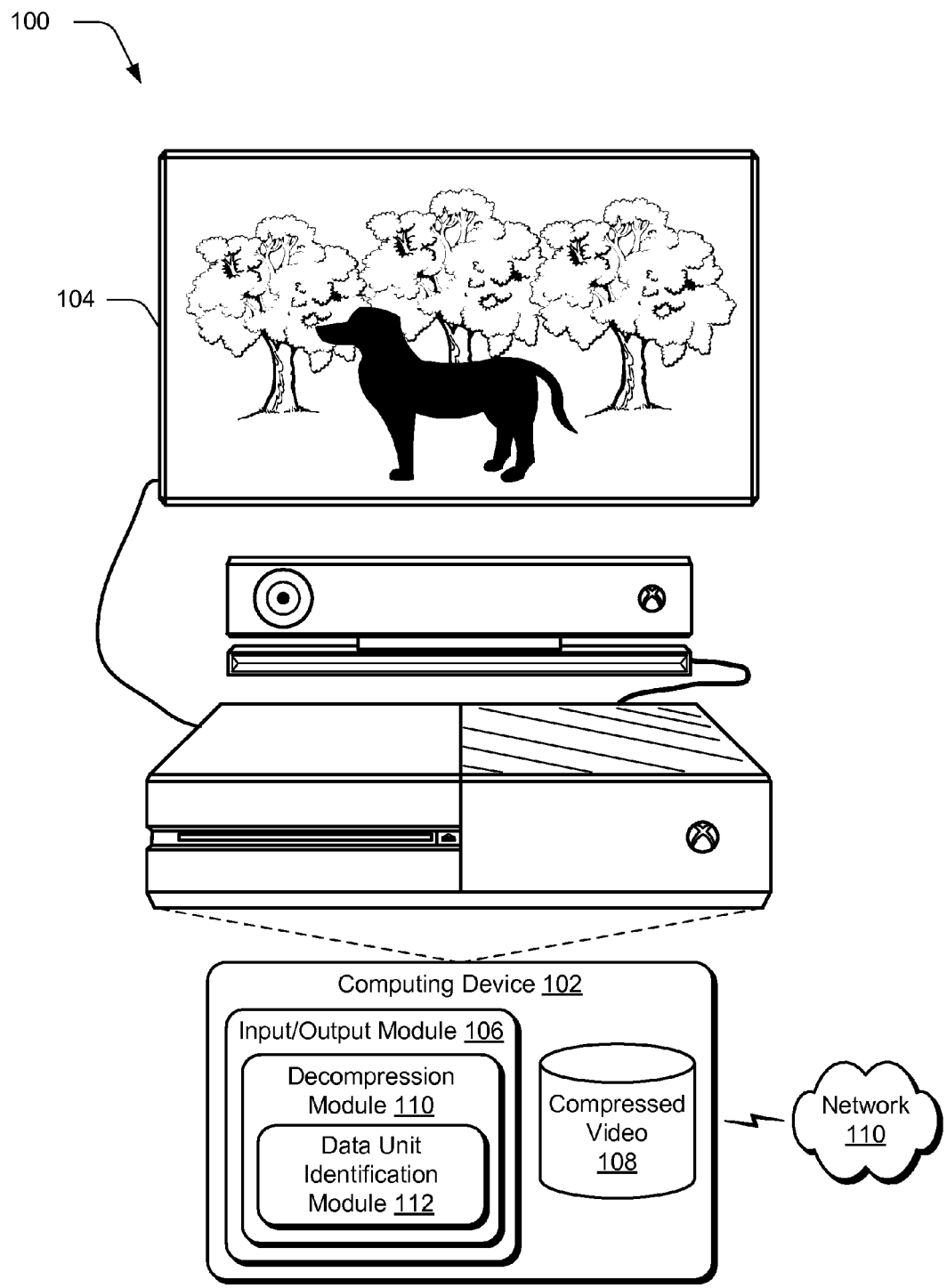
FIG. 1 is an illustration of an environment in an example implementation that is operable to employ data unit identification techniques described herein.

Compressed video streams may be utilized to transmit and store video for use by a wide range of computing devices. As part of this decompression, data units may be identified in the compressed video streams to locate which units include content that is to be decompressed for output and viewing via display on a display device.

Data unit identification in a compressed video stream is resource intensive, e.g., computationally expensive. For example, conventional techniques relied solely on a byte-by-byte examination of the compressed video stream to locate a start code of a frame to be decompressed. Thus, these conventional techniques may consume signification functionality of the processing system as well as other resources of a computing device to perform this identification, such as to consume battery power of a mobile computing device. The higher the bit rate, the more resources are consumed for data unit identification.

Data unit identification techniques for compressed video streams are described. In one or more implementations, the data unit techniques may leverage prior knowledge of a compressed video stream to assist in data unit identification. For example, knowledge of use of a progressive format in the video stream may be utilized to increase efficiency in locating an indication of a frame in the compressed video stream.

A byte-by-byte search, for instance, may be performed to process start codes of a frame, such as a sequence header binary data unit, an entry point header binary data unit, and so on. Upon reaching a frame binary data unit (BDU) that is indicative of a frame of content to be decoded, the rest of the compressed data belongs to the frame BDU and therefore may be skipped as part of the byte-by-byte search. This may be utilized to increase efficiency and reduce resource consumption to identify data units, e.g., complexity of data unit identification may be reduced by over one thousand times for compressed video content in 720p or 1080p. Further discussion of use of prior knowledge may be found in relation to FIGS. 2 and 3.

In another example, data unit identification may be performed at least in part through a search for a specific byte pattern. For example, it has been identified that the probability of a byte pattern "0x00 00" occurring in a compressed video stream is rather low, e.g., conceptually the probability is approximately 1/65536. Accordingly, single instruction and multiple data (SIMD) approach may be utilized as a batch processing technique to locate this byte pattern. Once located, a byte-by-byte search may be performed to determine whether the byte pattern is part of a start code pattern of "0x00 00 01". Additionally, techniques may be employed to address searches in contiguous or fragmented buffers. These techniques may also be utilized to increase efficiency and reduce resource consumption to identify data units, examples of which have exhibited improvements in performance of ten to thirty times conventional techniques, dependent on the bit rate of compressed video. Further discussion of use of specific byte patterns may be found in relation to FIGS. 2 and 4. Further, these techniques may be combined for use in an integrated system, an example of which is shown and discussed in relation to FIG. 5.

In the following discussion, an example environment is first described that is operable to employ the described herein. Example illustrations of the techniques and procedures are then described, which may be employed in the example environment as well as in other environments. Accordingly, the example environment is not limited to performing the example techniques and procedures. Likewise, the example techniques and procedures are not limited to implementation in the example environment.

Example Environment

FIG. 1 is an illustration of an environment 100 in an example implementation that is operable to employ the menu techniques described herein. The illustrated environment 100 includes an example of a computing device 102, which is illustrated as a game console that is communicatively coupled to a display device 104 (e.g., a television) but may be configured in a variety of other ways. For example, the computing device 102 may be configured as a traditional computer (e.g., a desktop personal computer, laptop computer, and so on), a mobile computing device (e.g., a mobile station, an entertainment appliance, a wireless phone, a tablet, a netbook, a portable game device), a game console, and so forth as further described in relation to FIG. 6. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is also illustrated as including an input/output module 106, which is representative of input/output functionality supported by the computing device 102. Thus, the input/output module 106 is representative of functionality relating to recognition of inputs and/or provision of outputs by the computing device 102. A variety of different inputs may be identified by the input/output module 106, such as to identify gestures, inputs from a peripheral device, and so on to cause operations to be performed that correspond to the inputs.

The input/output module 106 may also support a variety of different output functionality, such as to output audio and video for display by the display device 104. An example of this functionality is represented by a decompression module 110. The decompression module 110 is representative of functionality to decompress a compressed video stream, which may originate from a variety of sources. As illustrated, for instance, the computing device 102 may include storage for compressed video 108, which may be stored in computer-readable storage memory such as optical storage (e.g., Blu-Ray® disc), semiconductor-based memory, and so on that is accessible locally by the computing device 102. The compressed video stream may also be accessed remotely via a network 110, such as via the Internet from a streaming service.

Regardless of where the compressed video stream originated, the decompression module 110 may receive the video stream and decompress it for output. Part of this decompression involves data unit identification, functionality of which is represented as a data unit identification module 112. Data unit identification is performed to identify the various units of the compressed data stream, such as headers and payload of a frame to be decompressed.

Data unit identification in compressed video stream is computationally intensive. For example, a start code search to identify a data unit such as a bitstream data unit (BDU) and network access layer unit (NALU) identification in accordance with an SMPTE VC-1 standard, H.2645/HEVC standard, and H.264/AVC standard may consume a significant amount of processing system resources, e.g., CPU cycles. Thus, this search may also consume a significant amount of power and thus may affect battery life of a mobile computing device as well as consume a significant portion of available processing resources. Conventional solutions for data unit identification involve a byte-by-byte search of the compressed video stream for a start code, which is computationally expensive. Additionally, the higher the bit rate, the more CPU cycles are consumed to identify data units in the compressed video streams.

The data unit identification modules 112 may employ a variety of different techniques to improve efficiency of data unit identification. Examples of these techniques include use of prior knowledge as described and shown in relation to FIG. 3 and specific pattern identification and batch processing as described and shown in relation to FIG. 4. These techniques are applicable to a wide variety of standards and techniques, such as DirectX Video Acceleration (DXVA) for video decoding, SMPTE VC-1, H.264/AVC, H.264/MVC, H.264/SVC, HEVC/H.265, and so forth.

Figure 2:
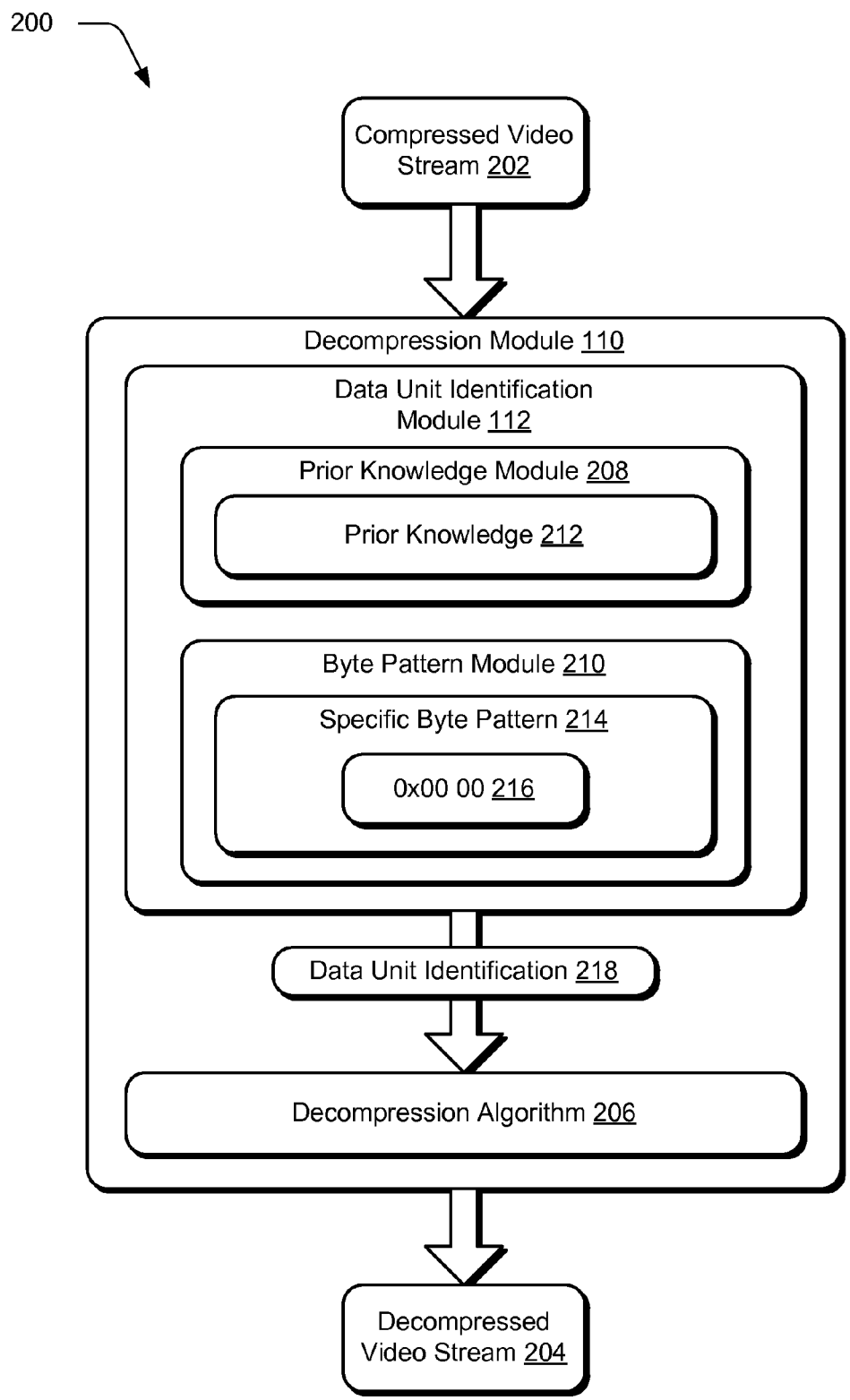
FIG. 2 depicts a system in an example implementation in which a compressed video stream is decompressed by a decompression module of FIG. 1, which is shown in greater detail.

FIG. 2 depicts a system 200 in an example implementation in which a compressed video stream is decompressed by a decompression module of FIG. 1, which is shown in greater detail. The decompression module 110 is illustrated as receiving a compressed video stream 202 and processing the stream to generate a decompressed video stream 204. As previously described, the compressed video stream 202 may be received from a variety of different sources, such as local storage, remotely via a network, and so on.

The decompression module 110 may then utilize a data unit identification module 112 and a decompression algorithm 206 to perform the decompression. The data unit identification module 112 is representative of functionality to identify data units which may then be processed by the decompression algorithm 206 to decompress those data units, e.g., headers and payload of frames of the video stream.

Examples of functionality that may be utilized to perform the data unit identification by the data unit identification module 112 are illustrated as a prior knowledge module 208 and a byte pattern module 210. The prior knowledge module is representative of functionality to leverage prior knowledge 212 about the compressed video stream 202 to assist data unit identification. For example, in a compressed video stream 202 compressed as a VC-1 bitstream each frame is encoded in progressive format and as solely as a single slice, BDU identification may be optimized according to the SMPTE VC-1 standard specification based on this knowledge. A variety of other examples are also contemplated as further described in relation to FIG. 3.

If prior knowledge 212 is not available for the compressed video stream 202, a byte pattern module 210 may be utilized by the data unit identification module 112. The byte pattern module 210 is representative of functionality to find a specific byte pattern 214 in the compressed video stream 202 which may assist in the location of data units. For example, it has been identified that the presence of byte pattern "0x00 00" 216 in a compressed video stream has a low probability. As this byte pattern may be included as part of a start code pattern, identification of data units may be improved by first looking for the specific byte pattern"0x00 00" 216 through use of a single instruction and multiple data (SIMD) search in a batch mode.

Once the specific byte pattern 214 is found as part of the SIMD search, the byte pattern module 210 may then revert to a byte-by-byte search to verify whether the start code pattern of "0x00 00 01" is present. Thus, batch processing performed by the single instruction and multiple data (SIMD) search may be utilized to improve efficiency and resource usage involved in data unit identification 218 performed by the data unit identification module 112. The techniques involved in performance of the SIMD search and byte-by-byte search may also be configured to address frame input in fragmental buffers and frame input in a whole contiguous buffer as further described in relation to FIG. 4.

Figure 3:
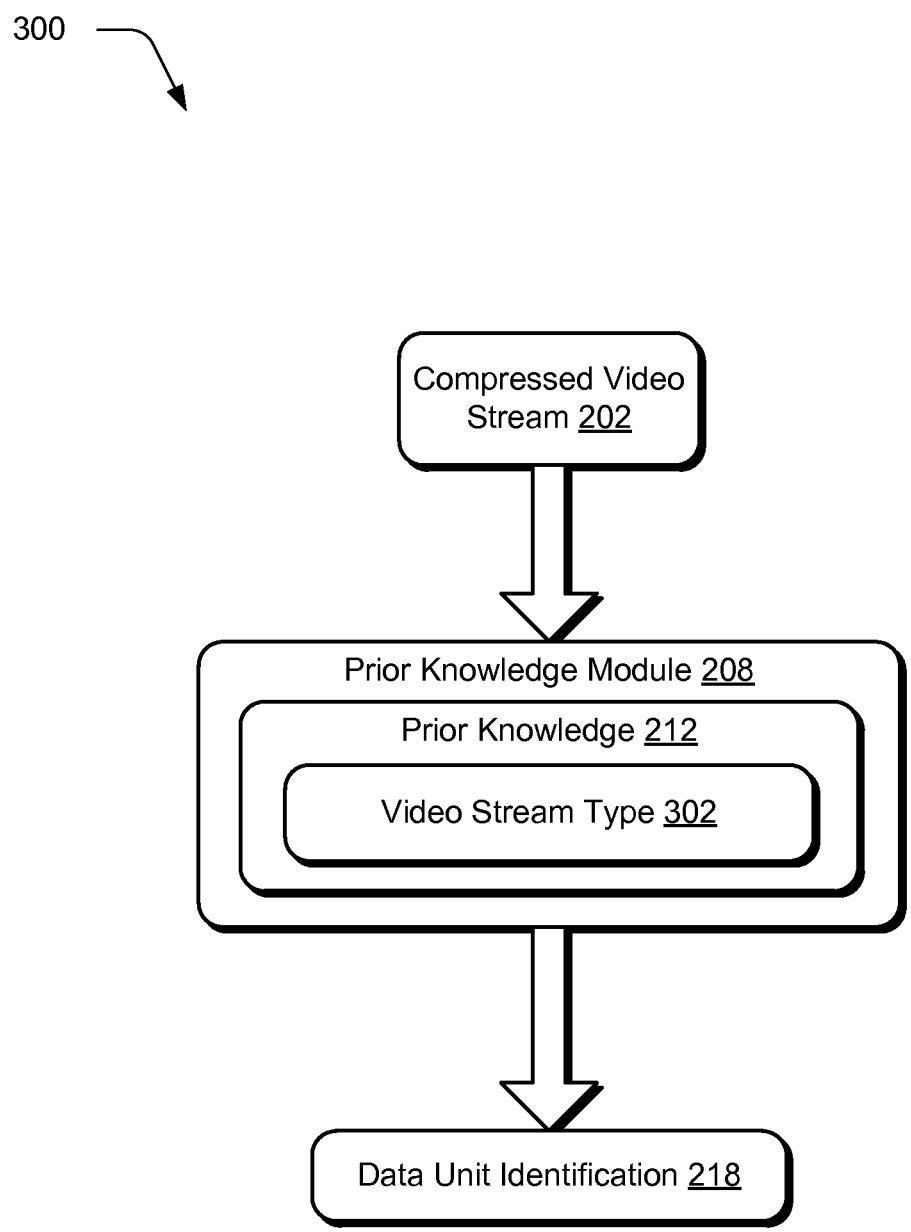
FIG. 3 depicts a system in an example system in which operation of a prior knowledge module of FIG. 2 is described in greater detail.

FIG. 3 depicts a system 300 in an example system in which operation of the prior knowledge module 208 of FIG. 2 is described in greater detail. As previously described, the prior knowledge module 208 may leverage prior knowledge 212 of a compressed video stream 202 to arrive at data unit identification 218. This prior knowledge 212 may be obtained in a variety of ways. For example, the prior knowledge 212 may be based on knowledge of a source of the compressed video stream 202, such as from a particular local storage device, streamed from a particular network address, and so forth. Prior knowledge 212 may also be based on the compressed video stream 202, such as through identification of data units for the stream that may be leveraged for subsequent identification for that stream. A variety of other examples are also contemplated.

When the prior knowledge 212 is available for the compressed video stream 202, this knowledge may be leveraged to assist in the data unit identification 218. The prior knowledge 212 may describe a variety of different characteristics of the compressed video stream 202 that may be leveraged. One example of such a characteristic is configuration of headers and payloads as well as the size of those data units.

For example, the prior knowledge 212 may describe a video stream type 302 for the compressed video stream 202, such as which encoding standard is likely utilized by the compressed video stream 202. When the compressed video stream 202 is a VC-1 encoded bitstream, for instance, and if each frame is encoded in a progressive format and as single slices, identification of binary data units may be improved by leveraging knowledge of the SMPTE VC-1 standard specification.

The SMPTE VC-1 standard specifies a layout of the binary data unit in Annex G Bitstream Construction Constraints—Advanced Profile and Annex E Start Codes and Emulation Prevention. According to the specification there, if the first binary data unit is the progressive frame coded slice, then an entirety of the buffer contains a single binary data unit of frame coded slice, i.e. all the data in the buffer belongs to a single frame binary data unit. Otherwise, some sequence header binary data unit and entry point header binary data unit is present before the frame binary data unit.

Sequence header binary data units and entry point header binary data units typically have a relatively small size, e.g., approximately ten bytes. Accordingly, the prior knowledge module 208 may leverage this prior knowledge 212 by performing a byte-by-byte search for start codes to identify those binary data units having the relatively small size.

Once a frame binary data unit is found, however, the rest of compressed data belongs to a frame binary data unit. Thus, processing of the rest of the compressed data for that frame may be skipped, e.g., for that buffer. In this way, use of the prior knowledge 212 by the prior knowledge module 208 may reduce the complexity of data unit identification by over one thousand times for typical video content in 720p or 1080p formats. Such assistance from prior knowledge for data unit identification is also applicable for other coding standards such as H.264/AVC, HEVC/H.265, and so forth. If prior knowledge 212 is not available for a compressed video stream 202, additional techniques may also be utilized to improve efficiency of data unit identification 218, an example of which is described as follows and shown in a corresponding figure.

Figure 4:
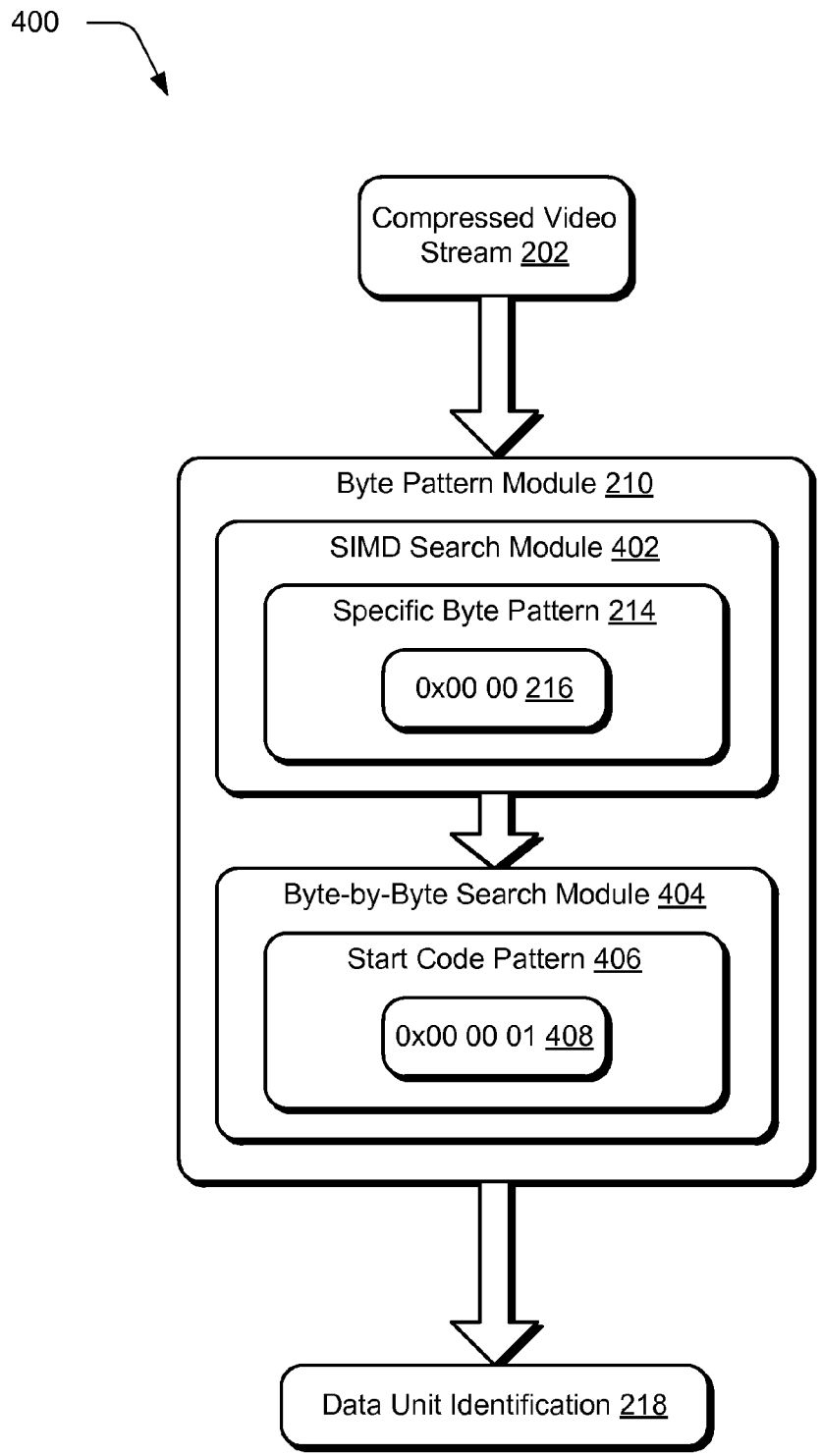
FIG. 4 depicts a system in an example system in which operation of a byte pattern module of FIG. 2 is described in greater detail.

FIG. 4 depicts a system 400 in an example system in which operation of the byte pattern module 210 of FIG. 2 is described in greater detail. As previously described in relation to FIG. 2, the byte pattern module 210 may process the compressed video stream 202 to perform data unit identification 218. This may be performed as part of the decompression module 110 solely, responsive to a determination that prior knowledge 212 of the compressed video stream 202 is not available as described in relation to FIG. 3, and so forth.

The byte pattern module 210 is configured to find a specific byte pattern 214 in the compressed video stream 202 to assist in data unit identification. For example, it has been identified that a chance of inclusion of the specific byte pattern 214 "0x00 00" 216 in compressed video stream is rather low. Accordingly, a single instruction and multiple data (SIMD) search module 402 may be configured to perform batch processing of the compressed video stream 202 using single instruction and multiple data (SIMD) operations. The SIMD operations, for instance, may be configured in accordance for use with a reduced instruction set computing (RISC) architecture or other architectures, such as NEON™ instructions on ARM®, SSE2, SSE4 and AVX instructions on Intel® architectures. The SIMD operations may be utilized in the batch mode to perform simultaneous search across different data sizes, e.g., 16, 32, 64 bytes.

If the specific byte pattern 214 is identified in the batch processing by the SIMD search module 402, a byte-by-byte search module 404 may be utilized to perform a byte-by-byte search to verify whether the specific byte pattern 214 is part of a start code pattern 406 in the compressed video stream 202, e.g., "0x00 00 01" 408. If the start code pattern 406 of "0x00 00 01" 408 is found, then the start of a new data unit is identified, i.e. it is the end of the previous data unit. Otherwise, the search for the specific byte pattern 214 by the SIMD search module 402 resumes.

Additionally, performance of the SIMD search module 402 may also be improved by addressing a particular standard used to perform the encoding of the compressed video stream 202, such as SMPTE VC-1 standard or H.264/AVC standard. For example, in the SMPTE VC-1 standard, the sizes of sequence header binary data unit and entry point header binary data unit are small, e.g., approximately 10 bytes. Further, there is a certain amount of overhead for pattern search in batch mode and therefore performance optimizations may not be realized if pattern search in batch mode is performed for those small binary data units.

Therefore, if the byte pattern module 210 detects that a current binary data unit type is a sequence header, an entry point or other binary data units types having relatively small sizes, a byte-by-byte pattern search is performed, which has better performance for these relatively small sizes. If the byte pattern module 210 detects that a current binary data unit type has a relatively large size, such as frame binary data unit, field binary data unit or slice binary data unit, a pattern search is performed in batch mode through use of the SIMD search module 402.

SIMD search and byte-by-byte search performed by the byte pattern module 210 may also be configured to address frame input in fragmental buffers and frame input in a whole contiguous buffer. When the data of a compressed frame is inside a single contiguous buffer, for instance, the byte pattern module 210 does not check whether the next byte or bytes are included in another subsequent buffer. Otherwise, valid access to the next byte would be verified and further, the last two bytes of the previous buffers are to be concatenated with bytes in current buffer and verified whether the specific byte pattern is present or not.

Accordingly, when prior information about compressed video bitstream is not available as described in FIG. 3, the byte pattern search in batch mode as described in relation to FIG. 4 may provide ten to thirty times performance improvement, compared to the convention byte-by-byte pattern search techniques. Additional description of these and other techniques may be found in relation to the following procedures.

Example Procedures

The following discussion describes data unit identification techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
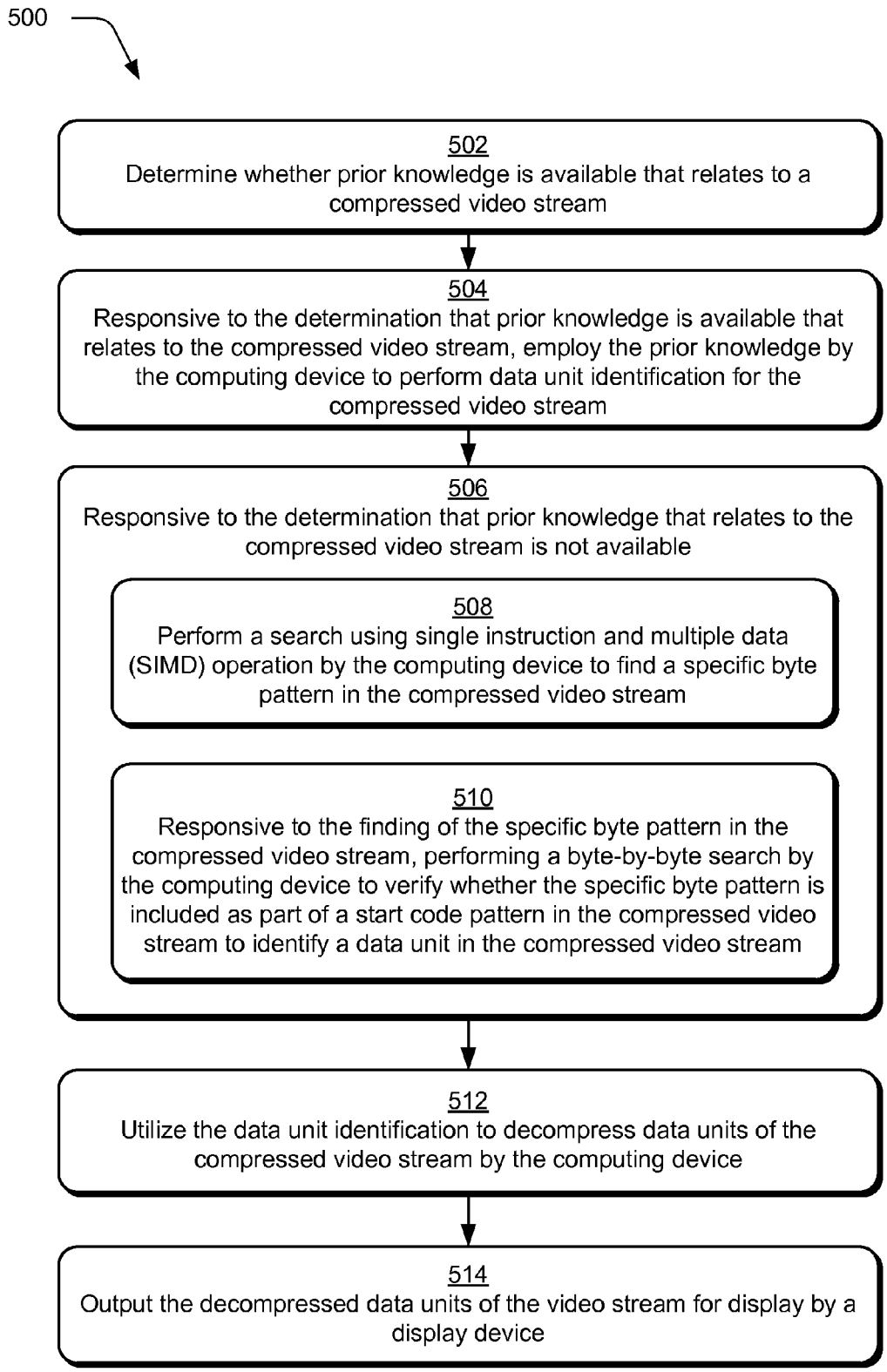
FIG. 5 is a flow diagram depicting an example procedure in which a compressed video stream may be decompressed using prior knowledge or through identification of specific pattern techniques.

FIG. 5 depicts an example procedure 500 in which a compressed video stream may be decompressed using prior knowledge or identification of specific pattern techniques. A determination is made as to whether prior knowledge is available that relates to a compressed video stream (block 502). As previously described, prior knowledge 212 may be based on identification of a variety of different characteristics of how the compressed video stream 202 is obtained (e.g., a source), processing previously performed on the compressed video stream 202 itself, identification of an encoding format used on the compressed video stream 202, and so forth.

Responsive to the determination that prior knowledge is available that relates to the compressed video stream, the prior knowledge is employed by the computing device to perform data unit identification for the compressed video stream (block 504). Continuing with the previous example, the prior knowledge 212 may be used to identify an encoding format and accordingly particular parts of the compressed video stream 202 that may be skipped for processing as part of the data unit identification.

Responsive to the determination that prior knowledge that relates to the compressed video stream is not available (block 506), batch processing techniques may be performed. For example, a search may be performed using a single instruction and multiple data (SIMD) operation by the computing device to find a specific byte pattern in the compressed video stream (block 508). Thus, a plurality of different portions of the compressed video stream 202 may be processed in parallel to locate the specific byte pattern 214. Responsive to the finding of the specific byte pattern in the compressed video stream, a byte-by-byte search is performed by the computing device to verify whether the specific byte pattern is included as part of a start code pattern in the compressed video stream to identify a data unit in the compressed video stream (block 510). Continuing with the previous example, a byte-by-byte search may then be performed to determine whether the specific byte pattern 214 "0x00 00" 216 is part of a start code pattern 406 "0x00 00 01" 408. If so, the data unit has been identified in this example by finding a frame boundary.

The data unit identification is utilized to decompress data units of the compressed video stream by the computing device (block 512). A decompression algorithm 206 employed by the decompression module 110, for instance, may utilize the data unit identification 218 to identify which parts of the compressed video stream 202 includes a payload to be decompressed, e.g., the content of a frame of video. The decompressed data units of the video stream are output for display by a display device (block 514), such as a display device 104 communicatively coupled to the computing device 102 of FIG. 1. A variety of other implementations are also contemplated, such as implementations in which use of the specific byte pattern techniques is not dependent on availability of prior knowledge.

Example System and Device

Figure 6:
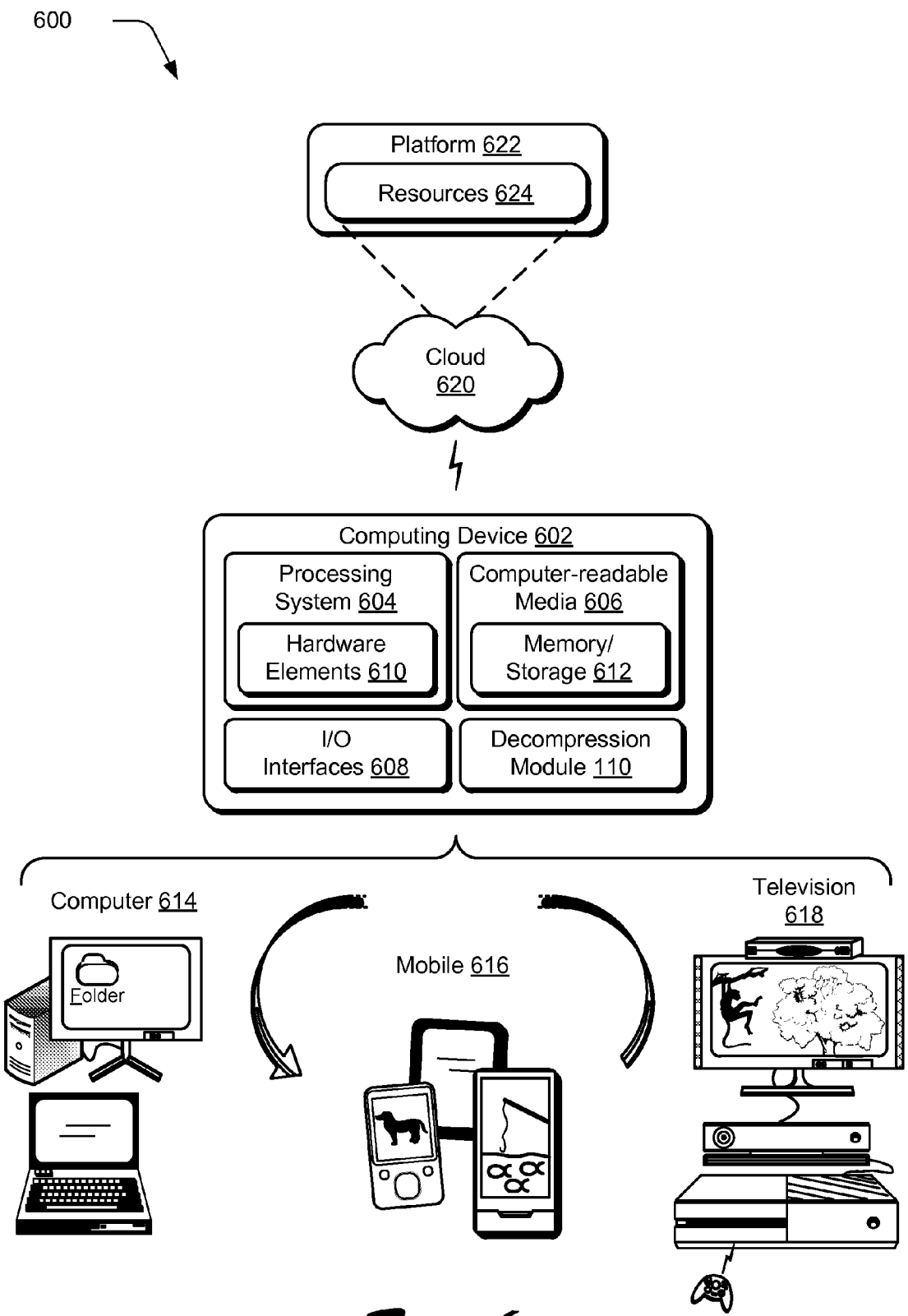
FIG. 6 illustrates various components of an example device that can be implemented as any type of portable and/or computer device as described with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. This is illustrated through inclusion of the decompression module 110 on the computing device 602. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 606 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device (e.g., game console), and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 620 via a platform 622 as described below.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device embodiment, implementation of functionality described herein may be distributed throughout the system 600. For example, the functionality may be implemented in part on the computing device 602 as well as via the platform 622 that abstracts the functionality of the cloud 620.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method that improves efficiency and lessens consumption of computing resources when performing data unit identification in a compressed video stream in order to locate a start code of a frame to be decompressed, the computer-implemented method being performed by one or more processors executing computer executable instructions for the computer-implemented method, and the computer-implemented method comprising:
   receiving a compressed video stream that is to be decompressed;
   determining whether there is data that represents prior knowledge as to information for the compressed video stream that can be employed to perform data unit identification for locating a frame that is to be decompressed in the compressed video stream without first relying on a byte-by-byte examination of the compressed video stream to locate a start code for the frame, in order to reduce consumption of computing resources otherwise used, and wherein the information that is employed to locate the frame comprises at least one of a source of the compressed video stream and different characteristics of the compressed video stream;
   responsive to the determination that there is data that represents prior knowledge as to the information for the compressed video stream that can be employed to perform data unit identification for locating the frame without first relying on a byte-by-byte examination of the compressed video stream, processing the data for the information that comprises at least one of a source of the compressed video stream and different characteristics of the compressed video stream, thereby performing the data unit identification for locating the frame that is to be decompressed for the compressed video stream; and
   once the data unit identification has been performed to locate the frame, thereafter performing a byte-by-byte search to locate a start code for the frame.

2. A computer-implemented method as described in claim 1, wherein locating the frame without first relying on a byte-by-byte examination of the compressed video stream comprises skipping the byte-by-byte examination of the compressed video stream for at least a part of the compressed video stream.

3. A method as described in claim 1, wherein performing the byte-by-byte search to locate the start code for the frame comprises reaching a frame binary data unit (BDU) that is indicative of a frame of content to be decoded, and thereafter skipping a remaining portion of the frame BDU.

4. A computer-implemented method as described in claim 1, wherein the data that represents prior knowledge as to information for the compressed video stream that can be employed to perform data unit identification and that comprises different characteristics of the compressed video stream is comprised of identification of an encoding format of the compressed video stream.

5. A computer-implemented method as described in claim 1, wherein the data that represents prior knowledge as to information for the compressed video stream that can be employed to perform data unit identification and that comprises different characteristics of the compressed video stream is comprised of an indication that each frame in the compressed video stream utilizes a progressive format.

6. A computer-implemented method as described in claim 1, wherein the data that represents prior knowledge as to information for the compressed video stream that can be employed to perform data unit identification and that comprises different characteristics of the compressed video stream is comprised of an indication that the data unit is a bitstream data unit (BDU) and that if a first bitstream data unit is a progressive frame coded slice, that an entirety of a buffer contains the first bitstream data unit, and otherwise that a sequence header bitstream data unit or entry point header bitstream data unit is present before a frame bitstream data unit.

7. A computer-implemented method as described in claim 1, wherein performing the byte-by-byte search to locate the start code for the frame comprises use of the byte-by-byte search to identify bitstream data units in the compressed video stream and upon identification of a frame bitstream data unit ceasing the identification for a remaining portion of a frame that includes the frame bitstream data unit.

8. A computer-implemented method as described in claim 1, further comprising decompressing one or more of the identified data units of the compressed video stream.

9. A computer-implemented method as described in claim 8, further comprising outputting the decompressed data units of the video stream for display by a display device.

10. A computer-implemented method as described in claim 1, wherein the compressed data stream is encoded using a standard in accordance with MPEG-1, MPEG-2, VP8, SMPTE VC-1, H.264/AVC, H.264/MVC, H.264/SVC, H.2645/HEVC standard, or HEVC/H.265.

11. A computer-implemented method as described in claim 1, further comprising:
determining when there is no data that represents prior knowledge as to information for the compressed video stream that can be employed to perform data unit identification for locating a frame that is to be decompressed;
thereafter performing a search without relying on a byte-by-byte examination of the compressed video stream to locate a start code for a frame to be decompressed, wherein the search is performed using single instruction and multiple data (SIMD) operation to find a specific byte pattern in the compressed video stream, thereby reducing consumption of computing resources otherwise used required by a byte-by-byte search; and
after finding the specific byte pattern in the compressed video stream, performing a byte-by-byte search to verify whether the specific byte pattern is included as part of the start code for the frame in order to identify a data unit in the compressed video stream.

12. A computer-implemented method as described in claim 11, wherein the single instruction and multiple data (SIMD) operation is configured in accordance for use with a reduced instruction set computing (RISC) architecture.

13. A computer-implemented method as described in claim 11, wherein the specific byte pattern is 0x00 00 and the start code pattern is 0x00 00 01.

14. A computer-implemented method as described in claim 11, further comprising:
detecting whether a current binary data unit (BDU) type corresponds to a sequence header BDU type or an entry point header BDU type;
responsive to the detecting that the current binary data unit (BDU) type does correspond to a sequence header BDU type or an entry point header BDU type, performing a byte-by-byte pattern search for the start code; and
when the current binary data unit (BDU) type does not correspond to a sequence header BDU type or an entry point header BDU type, thereafter performing the search using single instruction and multiple data (SIMD) operation.

15. A computer-implemented method as described in claim 11, wherein data of a compressed frame is inside of a single contiguous buffer and wherein performing the byte-by-byte search is not performed for another buffer.

16. A computer-implemented method as described in claim 11, wherein data of a compressed frame of the compressed video data is fragmented across a plurality of buffers and wherein performing the byte-by-byte search is performed for the plurality of buffers.

17. A computing system comprising:
one or more processors;
memory containing computer executable instructions which, when executed by the one or more processors, cause the computing system to operate with an architecture that improves efficiency and lessens consumption of computing resources when performing data unit identification in a compressed video stream in order to locate a start code of a frame to be decompressed, and wherein the architecture comprises:
a decompression module that receives a compressed video stream that is to be decompressed;
a data unit identification module that comprises:
a prior knowledge module that performs the following:
determines whether there is data that represents prior knowledge as to information for the compressed video stream that can be employed to perform data unit identification for locating a frame that is to be decompressed in the compressed video stream without first relying on a byte-by-byte examination of the compressed video stream to locate a start code for the frame, in order to reduce consumption of computing resources otherwise used, and wherein the information that is employed to locate the frame comprises at least one of a source of the compressed video stream and different characteristics of the compressed video stream;
responsive to the determination that there is data that represents prior knowledge as to the information for the compressed video stream that can be employed to perform data unit identification for locating the frame without first relying on a byte-by-byte examination of the compressed video stream, processes the data for the information that comprises at least one of a source of the compressed video stream and different characteristics of the compressed video stream, thereby performing the data unit identification for locating the frame that is to be decompressed for the compressed video stream; and once the data unit identification has been performed to locate the frame, thereafter performs a byte-by-byte search to locate a start code for the frame; and a byte pattern module that performs the following:

determines when there is no data that represents prior knowledge as to information for the compressed video stream that can be employed to perform data unit identification for locating a frame that is to be decompressed;

thereafter performs a search without relying on a byte-by-byte examination of the compressed video stream to locate a start code for a frame to be decompressed, wherein the search is performed using single instruction and multiple data (SIMD) operation to find a specific byte pattern in the compressed video stream, thereby reducing consumption of computing resources otherwise used required by a byte-by-byte search; and after finding the specific byte pattern in the compressed video stream, performs a byte-by-byte search to verify whether the specific byte pattern is included as part of the start code for the frame in order to identify a data unit in the compressed video stream.

18. A computing system as described in claim 17, wherein the specific byte pattern is 0x00 00 and the start code pattern is 0x00 00 01.

19. A computing system as described in claim 17, wherein locating the frame without first relying on a byte-by-byte examination of the compressed video stream comprises skipping the byte-by-byte examination of the compressed video stream for at least a part of the compressed video stream.

20. The computer system of claim 17, A computer-implemented method as described in claim 1, wherein the data that represents prior knowledge as to information for the compressed video stream that can be employed to perform data unit identification and that comprises different characteristics of the compressed video stream is comprised of an indication that each frame in the compressed video stream utilizes a progressive format.

21. A computer program product comprising one or more hardware storage devices containing computer executable instructions which, when executed by one or more processors, cause the one or more processors to perform a computer-implemented method that improves efficiency and lessens consumption of computing resources when performing data unit identification in a compressed video stream in order to locate a start code of a frame to be decompressed, and wherein the computer-implemented method comprises:

receiving a compressed video stream that is to be decompressed;

determining whether there is data that represents prior knowledge as to information for the compressed video stream that can be employed to perform data unit identification for locating a frame that is to be decompressed in the compressed video stream without first relying on a byte-by-byte examination of the compressed video stream to locate a start code for the frame, in order to reduce consumption of computing resources otherwise used, and wherein the information that is employed to locate the frame comprises at least one of a source of the compressed video stream and different characteristics of the compressed video stream;

responsive to the determination that there is data that represents prior knowledge as to the information for the compressed video stream that can be employed to perform data unit identification for locating the frame without first relying on a byte-by-byte examination of the compressed video stream, processing the data for the information that comprises at least one of a source of the compressed video stream and different characteristics of the compressed video stream, thereby performing the data unit identification for locating the frame that is to be decompressed for the compressed video stream;

once the data unit identification has been performed to locate the frame, thereafter performing a byte-by-byte search to locate a start code for the frame;

determining when there is no data that represents prior knowledge as to information for the compressed video stream that can be employed to perform data unit identification for locating a frame that is to be decompressed;

thereafter performing a search without relying on a byte-by-byte examination of the compressed video stream to locate a start code for a frame to be decompressed, wherein the search is performed using single instruction and multiple data (SIMD) operation to find a specific byte pattern in the compressed video stream, thereby reducing consumption of computing resources otherwise used required by a byte-by-byte search; and after finding the specific byte pattern in the compressed video stream, performing a byte-by-byte search to verify whether the specific byte pattern is included as part of the start code for the frame in order to identify a data unit in the compressed video stream.

* * * * *